Aug. 2, 1932.  B. DE MATTIA  1,869,671
VULCANIZING MOLD
Filed Oct. 26, 1928  3 Sheets-Sheet 1

Aug. 2, 1932. B. DE MATTIA 1,869,671
VULCANIZING MOLD
Filed Oct. 26, 1928 3 Sheets-Sheet 3

INVENTOR
By Barthold De Mattia
Morrison, Kennedy, Campbell
ATTORNEYS

Patented Aug. 2, 1932

1,869,671

UNITED STATES PATENT OFFICE

BARTHOLD DE MATTIA, OF CLIFTON, NEW JERSEY, ASSIGNOR TO NATIONAL RUBBER MACHINERY COMPANY, A CORPORATION OF OHIO

VULCANIZING MOLD

Application filed October 26, 1928. Serial No. 315,146.

This invention relates to vulcanizing apparatus and refers particularly to vulcanizing molds for use in the production of inner tubes and the like.

The most commonly used tube vulcanizing molds, prior to this invention, have embodied a pair of mold sections which are parted at both their inner and outer peripheries in the central circumferential plane of the mold cavity. Such molds have given rise to serious objections because, in closing, they frequently pinch the tubes between the meeting faces of the two mold sections and moreover produce circumferential fins or rinds on the inner and outer peripheries of the vulcanized tubes.

Some attempts have been made to overcome these objections, as by parting the mold off center such that one section (the fixed section) will contain two-thirds of the mold cavity, while the other section (the movable section) will contain only one-third of the mold cavity. This construction is also open to objections, such as difficulty of manufacture and difficulty of inserting and removing the tubes before and after vulcanization.

The present invention has for its object the provision of a sectional vulcanizing mold in which the insertion and removal of the tubes is greatly facilitated, and in which there is no danger of pinching the tubes in closing the mold or of forming objectionable fins or rinds thereon.

More specifically, the invention contemplates a mold formed of three sections enclosing a substantially circular mold cavity for receiving an unvulcanized tube, and characterized by three circumferential parting lines which intersect the mold cavity in planes offset from the central circumferential plane. One of the mold sections contains substantially half of the mold cavity and is mounted in a relatively fixed position, while the other two sections each contain considerably less than half of the cavity and are mounted for movement toward and from the fixed section as well as toward and from each other. One of the movable sections is hinged with reference to the fixed section, while the other is movable bodily in an axial direction, and means are provided for moving them to their open and closed positions as well as for locking them in closed relation. When the mold is opened, the axially movable section, being separated from the other two sections, serves as a base ring upon which the tubes can easily and quickly be mounted and from which they can as easily and quickly be dismounted. In the closing of the mold, this base ring moves downwardly into the plane of the stationary mold section and automatically seats the unvulcanized tube within the cavity of said stationary section, at the same time allowing the top hinged section to follow and complete the mold cavity without danger of pinching the tube. Preferably, the several mold sections are clamped tightly together in the closed condition of the mold by a piston which also serves to move the base ring toward and from the fixed section. This piston is slidable within a pressure cylinder, to the opposite ends of which a suitable pressure fluid, such as steam or compressed air, is admitted and exhausted by a suitable valve. A control rod for operating this valve extends forwardly below the fixed mold section and is adapted to engage with a slidable pin which, when the mold is locked, functions to retain the valve in set position, so that the piston cannot be moved until the mold is unlocked.

The foregoing and other objects, features and advantages of the invention will be readily understood from the following description in connection with the accompanying drawings, wherein one form of the invention has been shown by way of illustration, and wherein:—

Figure 1:
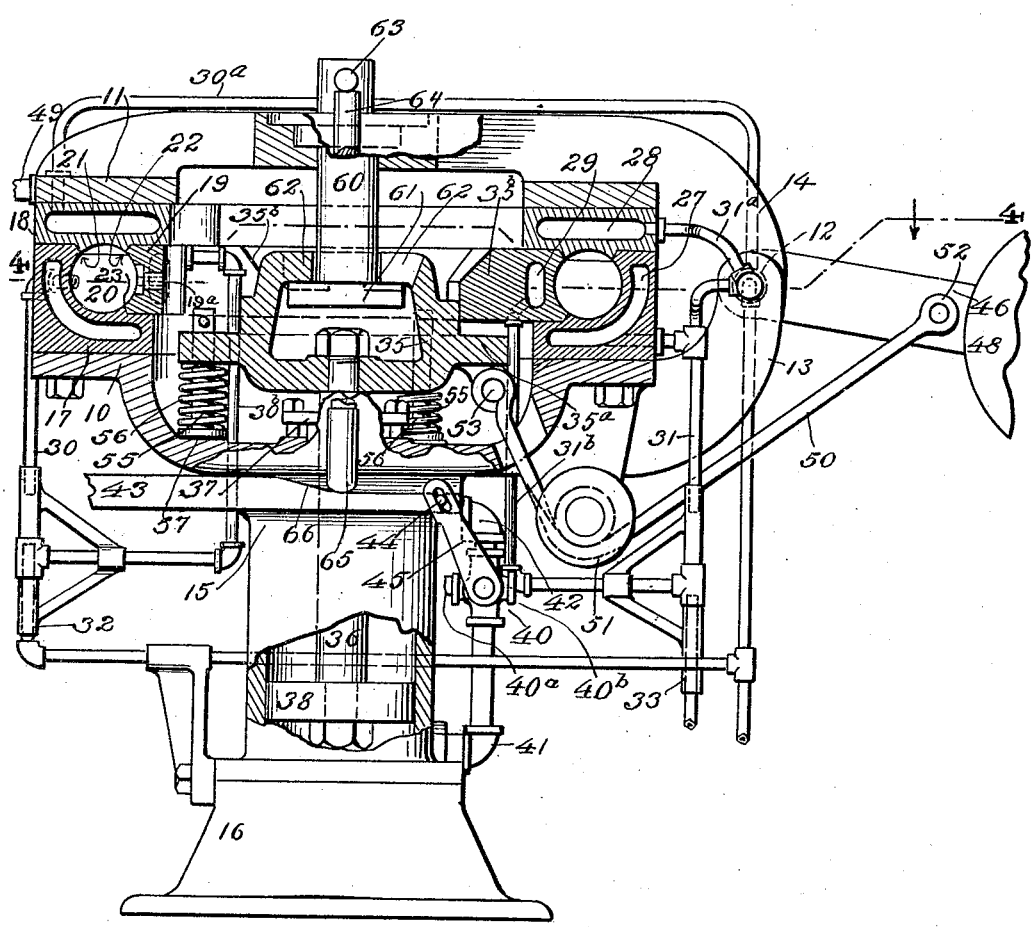
Fig. 1 is a vertical longitudinal sectional view through the improved vulcanizing mold with the parts in closed position.
Figure 2:
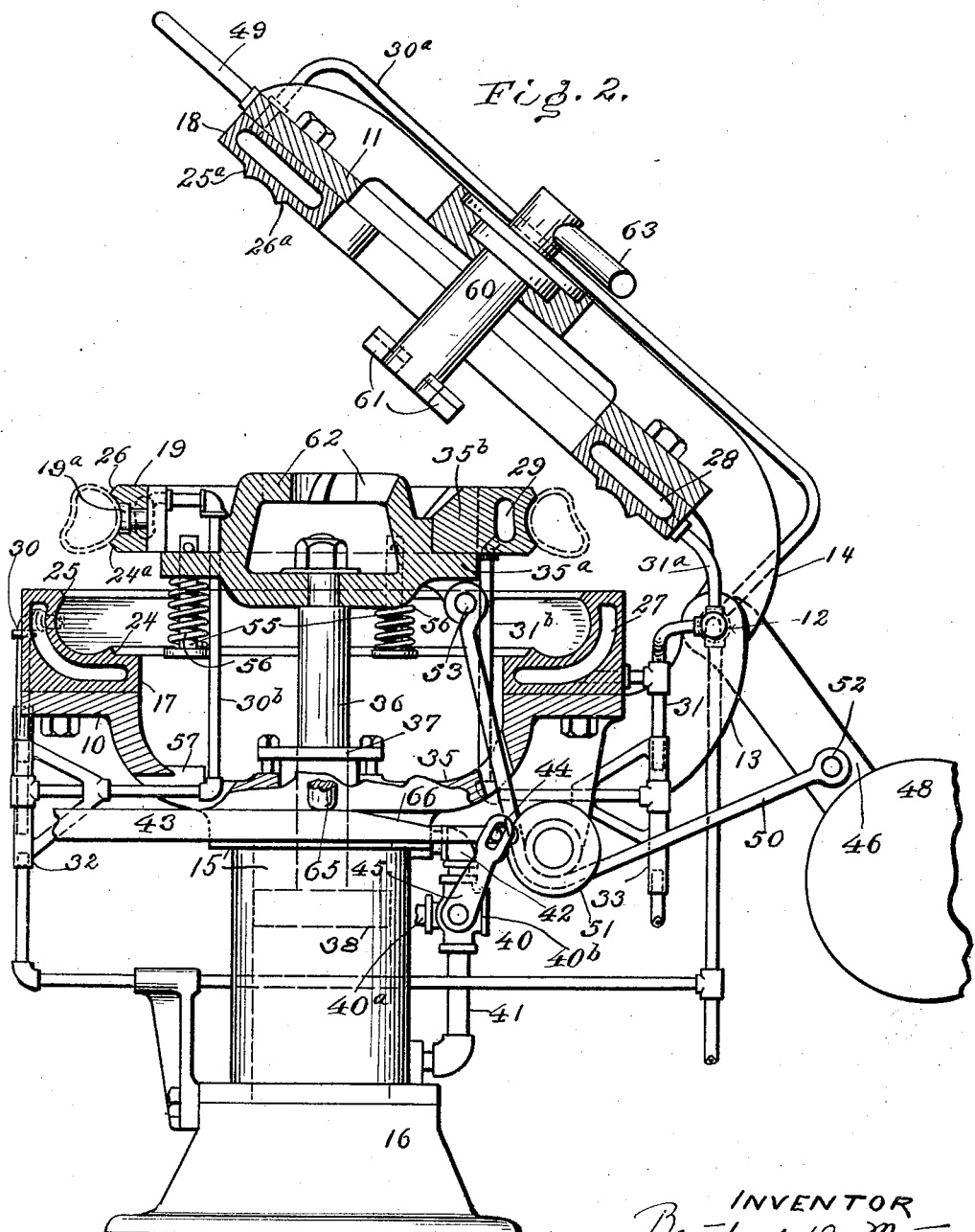
Fig. 2 is a similar view showing the mold opened.

The apparatus illustrated in the drawings is in reality a vulcanizing press which comprises a lower fixed platen 10 and an upper movable platen 11, the latter being pivoted to the lower platen by means of a hinge pin 12 extending through vertically elongated apertures or slots in arms 13 and 14, respectively, so that the upper platen may have a slight bodily play in the closing of the press. The lower platen is mounted upon or cast integral with a cylinderical post or standard 15 which is made hollow to serve as a pressure cylinder, and said cylyinder or post is mounted upon any suitable form of base 16. The platens 10 and 11 are respectively provided with mold section 17 and 18 which, in cooperation with a third or intermediate mold section 19, define between them an annular mold cavity 20 of substantially circular cross-section. As best shown in Figs. 1 and 2, the lower mold section 17 contains substantially half of the cavity 20, while each of the mold sections 19 and 20 contains substantially one-quarter of the cavity, these three sections being parted on circumferential lines 21 and 22 disposed at one side of the central circumferential plane of the cavity, and on a circumferential line 23 disposed at the opposite side of the central circumferential plane. As thus constituted, the lower fixed section 17 defines one side wall and the outer walls or tread of the mold cavity, the upper swinging section 18 the opposite side wall of said cavity, and the intermediate axially movable section 19 the inner wall or base of said cavity. While these several mold sections might be otherwise constituted, it is rather important in any case that the intermediate section be arranged to serve as the base of the mold cavity and present overhanging walls at opposite sides of the circumferential plane of the mold. Since, by such arrangement and construction of said section, the inner tubes may be properly centered and seated in the mold cavity without danger of pinching. The meeting or engaging portions of the mold sections, respectively numbered 24 and 24$^a$, 25 and 25$^a$, 26 and 26$^a$, are formed as complementary bevels, whereby to provide fluid-tight self-adjusting joints when the mold is closed (clearance being provided between the adjacent flat or horizontal surfaces) and these beveled portions further function to register the mold sections and to prevent the formation of objectionable fins or rinds on the vulcanized tubes. The mold sections are individually heated by the circulation of steam or other heating fluid through annular chambers 27, 28 and 29 which jointly surround the mold cavity 20, and which are respectively supplied with the heating fluid through suitable pipes 30, 30$^a$ and 30$^b$. These heating chambers 27, 28 and 29 are drained through similarly connected pipes 31, 31$^a$ and 31$^b$, and in order to permit the relative movement of the parts, the pipes 30$^a$ and 31$^a$ are connected through swivel joints coaxial with the hinge pin 12, and the pipes 30$^b$ and 31$^b$ are connected through telescopic joints 32 and 33.

The intermediate mold section 19 is carried by a cross head 35 secured to the upper end of a piston rod 36, which latter is slidable through a packing gland 37 and is provided on its inner end with a piston 38 disposed within the cylinyder 15, before mentioned. Thus, by raising and lowering the piston 38, the section 19 can be moved bodily in an axial direction into and out of the plane of the fixed section 17, whereby to facilitate the insertion and removal of the tubes. When the mold is opened as shown in Fig. 2, the intermediate section 19 rests upon an annular flange 35$^a$ of the cross head, it being centered thereon by means of radial lugs 35$^b$ which engage the periphery of the circular body portion of the cross head. However, when the piston is moved downwardly, the beveled portions 24$^a$ of the intermediate section come to rest on the portions 24 of the fixed section 17, and the cross head moves slightly away from the intermediate section as shown in Fig. 1. The admission and exhaust of pressure fluid to and from the opposite ends of the cylinder 15 is controlled by a four-way valve 40 arranged at the junction of a supply pipe 40$^a$ with cylinder inlet pipes 41 and 42, and this valve is operable by means of a sliding bar 43, which extends forwardly below the fixed platen 10 and has its rearward end connected as at 44 to the valve arm 45. The forward end of the sliding bar 43 is located in a convenient position for manipulation by the operator at the front of the press.

The arms 14 of the upper platen are preferably keyed or otherwise secured to the hinge pin 12, and in like manner there is secured to the hinge pin a counterbalance arm 46 extending rearwardly therefrom and provided with a suitable counterbalance weight 48. For convenience in operation, the upper platen 11 is also provided at its front side with a handle 49, by means of which the operator may manually swing the platen and its associated mold section to open and closed positions. The proportions of the counterbalance arm 46 and weight 48 are such that the upper platen 11 will normally be closed by the action of gravity, and in order to maintain it in its opened position as shown in Fig. 2, a flexible cable 50 is provided running over a guide roller or sheave 51, and having one of its ends connected to the counterbalance arm 46 at 52, and its other end connected to the lower side of the cross head as at 53. By virtue of this connection, the speed of the upper platen 11 in its downward movement will be limited by the cross head 35, and furthermore, the opening movement of the platen 11 can be effected by the upward movement of the cross head.

To arrest the downward movement of the cross head 35, three or more buffers are provided, each comprising a plunger 55 acted upon by a compression spring 56 at the lower side of the cross head. The upper ends of the springs 56 bear against the cross head, and the lower ends of the plungers 55 are adapted to bear against a central annular portion 57 of the fixed platen when the cross head is in its lowermost position.

Figure 3:
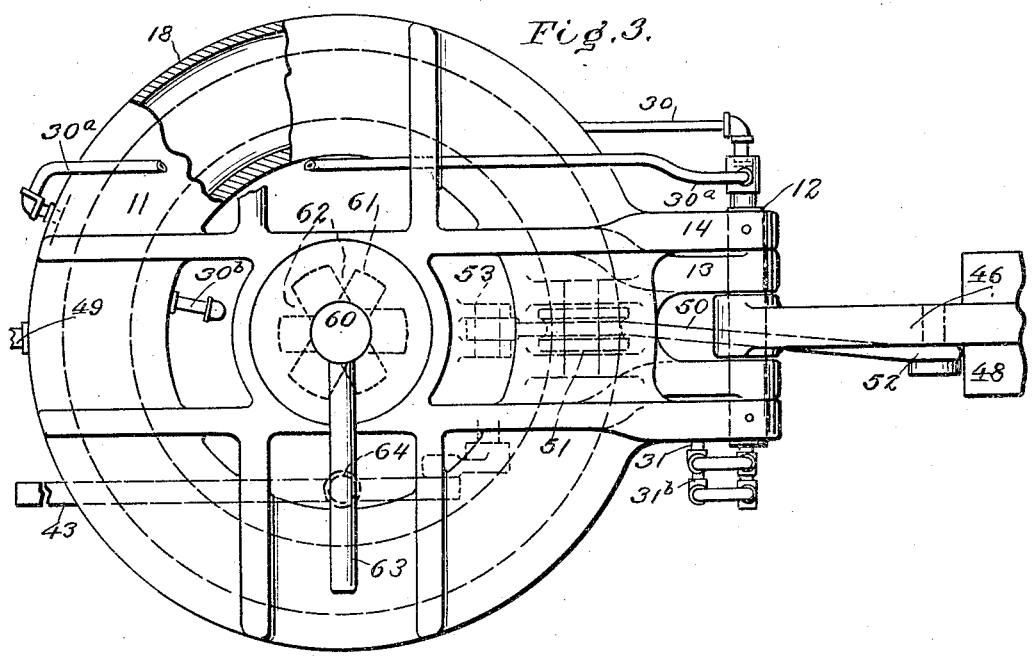
Fig. 3 is a top plan view of the mold.
Figure 4:
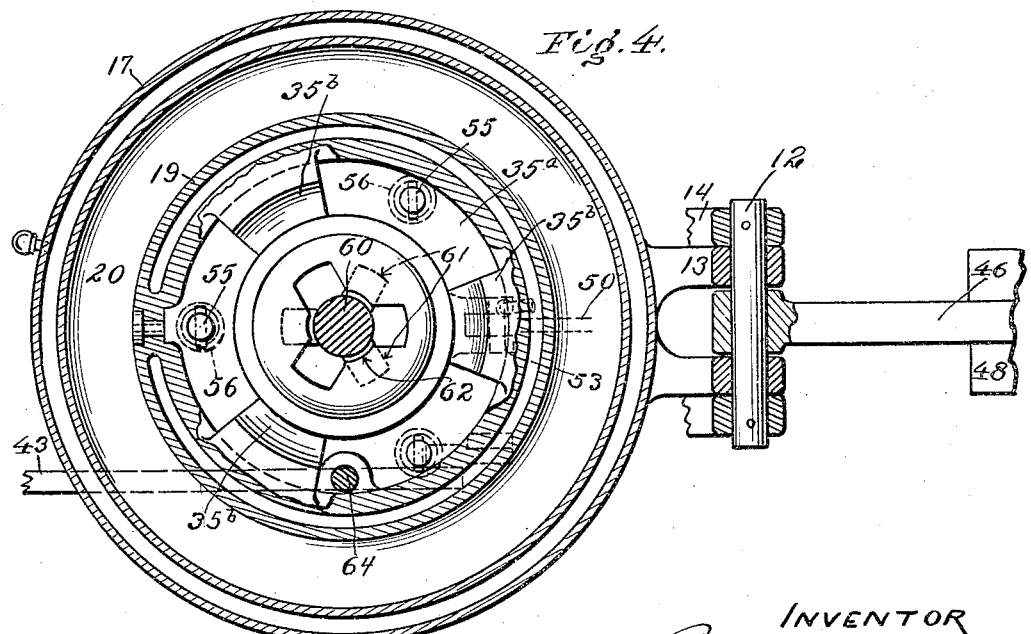
Fig. 4 is a substantially horizontal sectional view on line 4—4 of Fig. 1.

In order to clamp the mold sections tightly together when in closed relation, the upper platen 11 carries a rotatable post 60, which extends downwardly through an opening in the upper side of the cross head 35 and is provided at its lower end with radially extending lugs 61 adapted, upon rotation of the post, to bear against the lower surfaces of locking lugs 62 on the cross head (see Figs. 3 and 4). Thereafter, both the upper and the intermediate mold sections are drawn to a firm seating relation with each other and with the fixed section by the action of the piston, piston rod, and cross head.

Rotation of the post 60 is effected manually by means of a handle 63 which extends radially at the top of the press and which, in its locking position, is adapted to overlie with suitable clearance the upper end of a sliding pin or rod 64 extending upwardly through the two platens 10 and 11. This pin or rod 64 is disposed in the plane of the sliding bar 43 and has its lower end slightly rounded, as indicated at 65, whereby to ride upon the upper surface of the bar 43 and to be capable of being moved upwardly and downwardly by virtue of its engagement with a beveled cam surface 66 on the bar. The main body of the sliding rod 43 is of a greater width than that portion which is disposed rearwardly of the bevel 66, and the arrangement is such that, when the valve 40 is in position to admit pressure fluid to the upper side of the piston 38 and the post 60 turned to its locking position as shown in Fig. 1, the sliding bar 43 will be firmly held against rearward movement. This is a desirable feature in maintaining the movable mold sections 18 and 19 in properly seated relation with reference to the fixed mold section 17, and prevents accidental opening of the mold during the vulcanizing operation.

The operation is substantially as follows: When the press is open as shown in Fig. 2, the operator will apply an unvulcanized tube to the grooved periphery of the intermediate mold section 19, inserting the usual valve stem (not shown) through the wall of the mold section as at 19ª, and connecting the same with an air supply pipe, through the medium of which the tube may partially be inflated, if not inflated beforehand. The sliding bar 43 is then drawn forwardly to exhaust pressure from the cylinder 15 through the vent 40ᵇ, thus allowing the piston 38, the piston rod 36 and cross head 35 to fall by gravity, the spring buffers 56 cushioning the fall. In such downward movement, the tube becomes automatically seated within the cavity of the fixed mold section 17, the intermediate section 19 being arrested by the fixed mold section. In the meantime, downward movement of the cable connection at 53 permits the upper mold section 18 to follow the cross head and assume its closed position upon the other two mold sections, whereupon the operator can grasp the handle 63 and rotate the post 60 to bring the lugs 61 into locking position below the cross head lugs 62. Then, by drawing the rod 43 further forward, the valve 40 is turned to admit pressure through pipe 42 above the piston 38 and cause it to draw downwardly on the cross head 35 and through the locking bolt 60 impose suitable clamping pressure upon the mold sections to maintain them in proper mating relation, whereupon the contained tube can be fully inflated for the vulcanizing operation. After being subjected to pressure and heat for a sufficient length of time, the tube is first deflated, and the mold then unlocked by means of the handle 63, after which the sliding bar 43 is pushed rearwardly to operate the valve 40 for the admission of pressure fluid to the lower side of the piston 38, which immediately acts to open the mold by moving the parts to the position shown in Fig. 2, altho the springs 56, which were compressed in the final downward movement of the cross head 35, will effect the initial opening movement or cracking of the mold sections. If desired, the operator can raise the upper platen and its associated parts manually through the medium of handle 49 to assist the opening movement, altho such manual effort will not really be necessary when the flexible link 50 is provided as a connection between the cross head and the counterbalance arm.

If desired, the flexible connection 50 may be omitted, in which case the upper platen should preferably be overweighted by the counterbalance so as not to fall by gravity, making it necessary for the operator to manually move the upper platen to its closed position.

In the drawings, the platens and mold sections are shown as disposed in a horizontal plane, but in practice it may be desired to arrange them at an inclination, say, with the front edge of the mold slightly higher than the rear edge, for the purpose of facilitating the drainage of condensation from the heating chambers. In such a construction, the cylinder 15 will, of course, also be inclined a corresponding degree.

From the foregoing, it will be evident that an improved vulcanizing mold for inner tubes has been provided, constituting a substantial advance in the art. The apparatus can be economically manufactured, because of its simplicity of construction, and furthermore, it will be capable of giving high production, because of the fact that the tubes can be so easily applied to and removed from the intermediate mold sections. The disposition of the parting lines at opposite sides of the central circumferential plane of the mold and the provision of the beveled engaging portions prevent pinching of the tube and the formation of objectionable fins or rinds.

While the illustrated and described embodiment of the invention is particularly adapted for the vulcanization of inner tubes, the invention, in its broader aspects, is not restricted to such use but may be employed in the vulcanization of tires and other articles as desired. In fact, the invention is susceptible of numerous modifications in the details of construction and arrangement of parts, and the right is herein reserved to make such changes as fall within the scope of the appended claims without departing from the spirit of the invention.

Having thus described my invention, what I claim is:

1. A vulcanizing mold for inner tubes comprising three individually heated and relatively separable sections defining between them an annular mold cavity of substantially circular cross-section, the curved face of one of said sections forming the inner wall or base of the mold cavity and presenting overhanging portions at opposite sides of the central circumferential plane of the mold to provide a grooved seat for the inner tubes, and means for effecting the relative separation of the mold sections when the mold is opened.

2. A vulcanizing mold for inner tubes comprising a plurality of individually heated separable sections defining between them an annular mold cavity of substantially circular cross-section, the curved face of one of said sections forming the inner wall or base of the mold cavity and presenting overhanging portions at opposite sides of the central circumferential plane of the mold to provide a grooved seat for the inner tubes, and means for separating the mold sections to position the base section clear of the others to facilitate the mounting and dismounting of the inner tubes upon and from said section.

3. A vulcanizing mold for inner tubes comprising a plurality of individually heated separable sections defining between them an annular mold cavity of substantially circular cross-section, the curved face of one of said sections forming the inner wall or base of the mold cavity and presenting overhanging portions at opposite sides of the central circumferential plane of the mold to provide a grooved seat for the inner tubes, independent supports for the respective mold sections, and means for separating the mold sections to position the base section clear of the others and for moving them back into mating relation in carrying out succeeding vulcanizing operations.

4. A vulcanizing mold for inner tubes comprising a plurality of individually heated separable sections defining between them an annular mold cavity of substantially circular cross-section, the curved face of one of said sections forming the inner wall or base of the mold cavity and presenting overhanging portions at opposite sides of the central circumferential plane of the mold to provide a grooved seat for the inner tubes, independent supports for the respective mold sections, and fluid pressure means for separating the mold sections to position the base section clear of the others and for moving them back into and clamping them in mating relation in carrying out succeeding vulcanizing operations.

5. In a vulcanizing apparatus, the combination of a mold comprising a fixed mold section, a swinging mold section hinged with reference thereto, and an intermediate mold section, said three mold sections, when in closed relation, defining between them an annular mold cavity, means including a pressure cylinder for raising and lowering the intermediate mold section with reference to the fixed mold section, a manually operable valve for controlling admission and exhaust of pressure fluid to and from the opposite ends of the cylinder, means for locking the mold sections in closed relation, and means cooperating with said locking means to prevent actuation of the cylinder control valve when the mold is locked.

6. In a vulcanizing apparatus, the combination of a tube mold having an annular cavity of substantially circular cross section and comprising a lower fixed mold section, an upper movable section, and an intermediate movable section, the curved face of the latter forming the inner wall or base of the mold cavity and the other two sections being formed to complete the mold cavity, independent supports for the two movable mold sections, said supports being movably mounted to adjust said mold sections toward and from the fixed mold section and toward and from each other, complementary, beveled or cone shaped surfaces formed on the engaging portions of the three mold sections, and means for clamping said sections tightly together in the closed condition of the mold.

7. In a vulcanizing apparatus, the combination of a mold comprising a lower fixed mold section, an upper movable section, and an intermediate movable section, the latter forming the inner wall or base of a mold cavity and the other two sections being formed to complete the mold cavity, independent supports for the two movable mold sections, said supports being movably mounted to adjust said mold sections toward and from the fixed mold section and toward and from each other, fluid pressure means for effecting the movement of the intermediate base section, and additional means for detachably coupling said fluid pressure means to the upper section in the closed condition of the mold for drawing all three sections tightly together.

8. In a vulcanizing apparatus, the combination of a mold comprising a lower fixed mold section, an upper movable section, and an intermediate movable section, the latter forming the inner wall or base of a mold cavity and the other two sections being formed to complete the mold cavity, independent supports for the two movable mold sections, said supports being movably mounted to adjust said mold sections toward and from the fixed mold section and toward and from each other, fluid pressure means for effecting the movement of the intermediate base section and comprising a supporting member upon which the section is loosely mounted, spring buffers carried by said member to arrest its downward movement, and means for coupling said fluid pressure means to the upper mold section in the closed condition of the mold for drawing all three sections tightly together, the said spring buffers being compressed by such clamping action of the fluid pressure means.

In testimony whereof, I have affixed my signature hereto.

BARTHOLD DE MATTIA.